United States Patent [19]

Ballard et al.

[11] 4,130,687

[45] Dec. 19, 1978

[54] INORGANIC FOAM

[75] Inventors: Denis G. H. Ballard; Colin S. Cundy; Graham R. Rideal, all of Runcorn, England

[73] Assignee: Imperial Chemical Industries Limited, London, England

[21] Appl. No.: 787,377

[22] Filed: Apr. 14, 1977

[51] Int. Cl.$^2$ ............................................. B32B 3/26
[52] U.S. Cl. ................................ 428/310; 106/87; 106/88; 428/920
[58] Field of Search ................ 252/378 R, 378 P; 428/310, 92 D, 324, 311, 313, 314, 323, 328, 331, 446, 454, 539, 542; 106/85, 86, 87, 88

[56] References Cited

U.S. PATENT DOCUMENTS

| | | | |
|---|---|---|---|
| 3,062,753 | 11/1962 | Hayes | 252/378 R |
| 3,076,546 | 2/1963 | Ziegler et al. | 252/378 R |
| 3,466,222 | 9/1969 | Curtis | 428/538 |
| 3,995,086 | 11/1976 | Plunguian | 428/310 |

FOREIGN PATENT DOCUMENTS

| | | |
|---|---|---|
| 1016385 | 1/1966 | United Kingdom. |
| 1076786 | 7/1967 | United Kingdom. |
| 1119305 | 7/1968 | United Kingdom. |

OTHER PUBLICATIONS

*Chem. Abstr.*, vol. 84, No. 18, May 3, 1976, p. 270, Abstr. No. 125896n, "High Power Lightweight Inorganic Thermal Insulator".
*Chem. Abstr.*, vol. 84, No. 20, May 17, 1976, p. 300, Abstr. No. 139940j, "Foamed Inorganic Polymers As Building Materials".
*Chem. Abstr.*, vol. 85, No. 22, Nov. 29, 1976, p. 384, Abstr. No. 165723f. "Low Density Inorganic Foam Product".

*Primary Examiner*—William J. Van Balen
*Attorney, Agent, or Firm*—Cushman, Darby & Cushman

[57] ABSTRACT

A rigid cellular foam of Vermiculite lamellae made by drying the frothy mass formed when an aqueous suspension is gasified.

27 Claims, No Drawings

INORGANIC FOAM

This invention relates to inorganic foams and in particular to rigid foams of minerals.

According to the present invention there is provided a rigid foam comprising an inorganic cellular structure composed of lamellae of vermiculite.

Vermiculite is a phyllosilicate mineral i.e. one having a layer structure. Vermiculite may be swollen by the action of aqueous salts and thereafter the structure broken down (i.e. delaminated) by mechanical action into extremely thin lamellae. Other phyllosilicate minerals for example hydrobiotites, or chlorite-vermiculites also contain a substantial proportion of vermiculite layers and these also may be exfoliated in the same or similar manner. These minerals which contain vermiculite layers also give rise to thin lamellae and it is to be understood that they are included in the present invention. It is preferred to use the lamellae of vermiculite itself for the formation of the inorganic foam of this invention.

According to a preferred aspect of the present invention there is provided a rigid foam comprising a cellular structure having the cell walls thereof composed of overlapping individual vermiculite lamellae adhering together by mutually attractive forces. The cellular structure extends continuously and substantially uniformly in all dimensions throughout the volume of the foam formed. The overlapping lamellae constitute the boundary walls of each cell in the cellular structure so that, in the structure as a whole, the individual lamellae are present in all possible orientations with respect to a given plane of reference. Thus, the foam of the present invention may be distinguished from the heat exfoliated vermiculite granules which have been produced hitherto. In these heated granules a low density form of the mineral is produced wherein, within each granule (which was a separate particle before heat-exfoliation) the layers of the mineral are forced apart during the heating process but remain substantially parallel to oneanother Furthermore, such a structure exists only within each granule and does not extend to a continuous structure between granules. This known form of low-density vermiculite is not included within the scope of the present invention.

The aforementioned individual lamellae, which may alternatively be termed platelets or flakes, possess for example a small dimension of less than 0.5 μm, preferably less than 0.05 μm, especially less than 0.005 μm and have approximately similar length or breadth dimensions of at least a hundred, preferably at least a thousand, times greater than that of the small dimension.

The density of the foams of this invention lies in the range less than 0.5 g/ml and usually less than 0.15 g/ml and for especially "light" foams the density may be for example as low as 0.01 g/ml.

The density may be varied in several different ways, for example by incorporating different amounts of gas into the suspension or by altering the solids content of the suspension. For a low density foam the solids content may be suitably from 5 to 20% by weight whereas if a higher density foam is required the solids content may be increased to 30% w/w or more.

According to a further aspect of the present invention there is provided a process for producing a rigid vermiculite foam comprising the production of a suspension of vermiculite lamellae in a liquid medium, preferably an aqueous liquid medium, gasification of the suspension to form a froth and removal of the liquid medium from the froth by evaporation.

The swelling and delamination of vermiculite to give aqueous dispersions of vermiculite lamellae has been described in several publications for example UK Patent Specifications Nos. 1,016,385; 1,076,786 and 1,119,305 and by Baumeister and Hahn "Micron" 7 247 (1976): the procedures disclosed therein are applicable to the present invention. However for the formation of foams we prefer to have a surface active agent or a foaming agent present in the suspension prior to the gasification of the suspension to form the froth; which term includes an expanded form of the whole suspension.

It is advantageous for the surface active agent or foaming agent to be one which is capable of penetrating the structure of the mineral and thus will swell the mineral and allow delamination to occur. We especially prefer to use a cationic organic salt which is capable of undergoing ion exchange with the cations present in the vermiculite layers. Cationic surface active agents which are especially favoured are the hydrocarbon substituted ammonium group of surfactants. For example the substitution may be of from 1 to 4 hydrogen atoms on the ammonium cation by alkyl, aryl, alicyclic, or heterocyclic groups.

Examples of preferred cationic salts are n-butyl ammonium chloride
isobutyl ammonium chloride
isoamyl ammonium chloride
cetyl pyridinium bromide
cetyl trimethyl ammonium bromide
2-ethyl hexyl ammonium chloride
dodecyl ammonium chloride
lysine monohydrochloride
ornithine monohydrochloride and
polypeptides in cationic form.

Other types of foaming agents or foam-producing surfactants may also be employed as additives to the suspension of vermiculite lamellae, as adjuvants to other swelling agents e.g. alkali metal chlorides or in combination with the aforementioned cationic salts, for example long-chain aliphatic alcohols (e.g. cetyl alcohol), alkyl sulphate salts, (e.g. sodium lauryl sulphate) N-acyl sarcosinates and long-chain aliphatic amine oxides (e.g. oleyl dimethyl amine N-oxide).

An alternative class of foaming agents which may be used with advantage as additives to the suspension of vermiculite lamellae are the protein type foaming agents for example water-soluble proteins (such as albumin or gelatin) or water solubilised protein derivatives such as hydrolysed soya bean and hydrolysed blood or feathers.

The liquid medium, if aqueous, may contain water-miscible organic liquids for example the lower alcohols or acetone. Alternatively the foam may be produced in a non-aqueous medium using suitably modified vermiculites as described in UK Pat. No. 1,076,786.

The gasification process may be performed by means of a release of gas or vapour in the suspension of vermiculite lamellae preferably one which is substantially inert to the aqueous suspension for example air, nitrogen, argon, carbon dioxide, a hydrocarbon, chlorocarbon, fluorocarbon or chlorofluorocarbon. The gasification may more conveniently be performed by mechanically entraining the gas in the suspension by rapid agitation for example by rapid churning or whisking of the suspension. Alternatively the suspension may be rapidly heated and the foam produced by gasification due either to steam produced by evaporation of water or to liberation of gas dissolved in the sample.

By the term rigid foam we mean a two phase dispersion of gas in solid, the solid phase being an essentially continuous inorganic cellular structure. Small quantities of organic materials may be present in the foam, which may be either deliberately added or inadvertently present, but the organic material is not fundamental to the cohesion of the cellular structure although it may usefully modify the properties thereof. On removal of water from an aqueous dispersion of vermiculite lamellae, the lamellae come together to form a coherent film. Accordingly the cell walls of the cellular structure of the present invention derive their mechanical strength largely or wholly from the self-adhesion of the flakes when water is removed. The resulting structure is a non-brittle foam i.e. under stress the structure may deform without crumbling.

The cellular vermiculite is a useful heat-resistant and heat insulating material which may be cast as a foam-filling for cavities and voids or which may be used as a coating for the outside of materials for example wood or steelwork; in both cases the vermiculite foam acting inter alia as a fire-protective layer. The vermiculite foam may be produced as a slab stock for subsequent fabrication or other lamination. An inner sandwich of vermiculite foam as herein provided, optionally bounded for example by sheets of woodveneer, paper, asbestos, mica or plastic, or by vermiculite sheet, forms useful decorative construction panels: the vermiculite foam may be sandwiched between plaster-board or sheets of thermo-setting resin e.g. melamine resin. The fore-going structures form useful fire-resistant and/or sound insulating panels for the building industry, panels which may be maintained at temperatures of ca.1000° C. without disintegration. Sheets of vermiculite foam may be applied as facings to polyurethane foam panels by conventional lamination techniques in order to improve the fire resistance of the polyurethane foam core. The froth i.e. the gasified suspensions before drying may be conveniently used to bond together previously formed vermiculite structures e.g. sheets or slabs of foam already in dried form and so cement several sheets together and build up larger structures. In a similar way the heat-exfoliated vermiculite granules may be cemented together by means of the same froth and thus a composite structure is formed consisting of the foam of the present invention as a continuous cement between granules of heat-exfoliated vermiculite.

For some applications the vermiculite foam may require a water-proofing treatment for example a treatment with ammonia as described in our copending application in the name of Cundy et al — Ser. No. 889,924, filed Mar. 24, 1978.

The invention is illustrated by the following Examples.

EXAMPLE 1

1 Kg of vermiculite ore of South Africa origin known as Mandoval micron grade was refluxed in 5 liters of saturated sodium chloride solution for 30 minutes. Excess brine was decanted off and the vermiculite washed in 5 liters of distilled water. This was followed by five separate washings of the solid with 1 liter aliquots of distilled water on a Buchner filter funnel. The wet cake of vermiculite was returned to the refluxing vessel and refluxed for 2 hours with 1.25 mole of butyl ammonium chloride made up to 5 liters volume with distilled water. After reflux, a washing procedure as described above was carried out during which a rapid expansion of the vermiculite to about six times its original volume occurred. After standing overnight the supernatant liquid was decanted off and the 6 liters of swollen vermiculite ore was divided into two portions of approximately 3 liters each and each made up to 4 liters with distilled water in a large beaker.

Each suspension was then sheared for one hour using a rotary-bladed mixer dipping into each beaker and working at 6,500 rpm. The suspension was maintained near to ambient temperature by a spray of cold water to the outside of each beaker. Air became entrained in the suspension of the lamellae during this process and a froth appeared on the surface of each suspension. The depth of froth increased when the suspension was allowed to stand for 30 minutes and ca. 600 ml of foam was scraped from the suspension in each beaker.

The foam was placed in a mould and dried in a well ventilated oven at 60° C. A hard foam of vermiculite having a density of 0.08 g/ml was removed from the mould. The foam had adopted the permanent shape of the mould and had acquired a skin film of vermiculite over the surface.

The suspension of lamellae was churned at high-speed again for a period of 60 minutes and allowed to stand for a further 30 minutes whereupon a fresh quantity of froth appeared. The process was repeated several times and thereby several batches of foam were made from the same suspension. These were combined and removed to a mould and dried in the oven to form a solid foam of density 0.08 g/ml and average cell diameter 0.7 mm

EXAMPLE 2

A sample of ground vermiculite ore from the deposits in North America (Zonolite No 4) was refluxed for 30 minutes in a saturated solution of sodium chloride and thoroughly washed with several portions of distilled water. The particles were then given a two hour reflux in an aqueous solution of n-butyl ammonium chloride followed again by a thorough washing in distilled water. During this second washing (which may last conveniently between a few minutes and several hours) a pronounced swelling of the particles occurred to approximately six times their original wet volume. This was then a sample of expanded vermiculite.

The weight ratio of the aqueous suspension of the swollen vermiculite was adjusted by removal of water by filtration until the weight ratio was approximately 10% vermiculite solids to 90% liquid water. The suspension was placed in a high-shear mixer (manufactured by Greaves Limited) which had a blade capable of rotating at 6,500 rpm and the suspension was mechanically milled or macerated for a period of 10 minutes. During this process air was entrained in the suspension and when the rotation of the blade was stopped and the suspension allowed to stand for 5 minutes several inches depth of froth was present above the suspension. The froth was taken off with a knife and spread on a tray. The tray containing the froth was placed in a well-ventilated oven at ca. 60° C. and and the water removed by evaporation, optionally aided by a fan or extractor in the oven. When dry the foam could be removed from the tray as a solid cellular vermiculite structure having a density of less than 0.1 g/ml and average cell diameter of 0.5 mm.

EXAMPLE 3

A sample of Zonolite No 4 vermiculite was treated as described in Example 2 the suspension being milled for 60 minutes. The density of the resultant foam was 0.035 g/ml and the average cell diameter was 0.5 mm.

EXAMPLE 4

South African vermiculite was expanded as described in the first paragraph of Example 1. After adjusting the solids content of the swollen vermiculite suspension to 20% w/w it was stirred until homogeneous and subjected to a single pass through a mill of the type known as a "rotor-in-stator" mill, running at a speed of 20,000 rpm. Before passing into the shearing zone of the mill, air was metered into the suspension at a rate of 10 liter/min. The whole suspension was converted to a thick froth which on standing overnight separated out into a lower liquid layer containing some of the larger sized vermiculite particles and another layer of wet vermiculite froth. The froth (which was observed to be stable for several weeks in the wet stage) was collected and dried in a wire-mesh mould in a well ventilated oven at 80° C. A slab of foam of dimensions 12 × 12 × 2 was formed and was found to have the following properties:

| Density | 0.22 g/ml |
| Compressive strength | 0.11 $MNm^{-2}$ |
| Thermal conductivity | 0.060 $Wm^{-1}K^{-1}$ |
| % closed cells | 12% |
| Average cell diameter | 1.5 mm |

EXAMPLE 5

3 Kg of American vermiculite was expanded in a similar manner to that described in the first paragraph of Example 2. The swollen vermiculite was then divided into 9 batches, each of which was milled for 45 minutes in a Greaves mill, in order to produce suspensions of delaminated vermiculite. The 9 batches were then combined and the larger particles of vermiculite removed by passing the suspension through a 50 μm sieve. The resultant "classified" suspension which contained approximately 5% solids by weight, was evaporated on a large heated tray to increase the solids content to 20%. Air was then beaten into the thick suspension using a culinary mixer, using the whisking attachment. An approximately two fold volume increase of the suspension took place and a small bubble size wet foam was produced from the whole suspension. The foam was spread on a heated tray and dried overnight to form a board 6 feet × 4 feet × ¼ inch. The dried foam had the following properties:

| Density | 0.12 g/ml |
| Compressive strength | 0.30 $MNm^{-2}$ |
| Thermal conductivity | 0.060 $Wm^{-1}K^{-1}$ |
| % closed cells | 41% |
| Average cell diameter | 0.2 mm |

EXAMPLE 6

3 Kg of South African vermiculite was expanded as described in the first paragraph of Example 1. When the expansion was complete the supernatant water was decanted off and the swollen vermiculite milled in 750 ml aliquots in a domestic liquidiser for 10 minutes. The thick, but pourable suspension was found to have solids content of 20% w/w. The suspension was foamed using a culinary mixer as described in Example 5. The foam was then dried in an oven at 90° C. overnight to form slabs of dimensions 24 × 12 × ¼ inches. Several slabs were laminated using wet froth and a larger slab of dimensions 12 × 12 × 1½ inches was formed and dried in an oven. The physical properties of the larger slab were measured as

| Density | 0.07 g/ml |
| Compressive strength | 0.05 $MNm^{-2}$ |
| Thermal conductivity | 0.048 $Wm^{-1}K^{-1}$ |
| % closed cells | 6% |
| Average cell diameter | 0.5 mm |

EXAMPLE 7

A non-foamed suspension of American vermiculite (20% w/w solids content) was prepared as described in Example 5. In this case the suspension was not aerated but was placed in an oven at 140° C. for 3 hours, causing rapid evolution of water vapour which produced a dry foam of density 0.10 g/ml.

EXAMPLE 8

170 g of South African vermiculite suspension prepared according to the method described in Example 5 the solids content adjusted to 13% w/w and placed in an "Aerosol" container which was adapted to be pressurised. A mixture of 18 g of dichloro difluoromethane and 12 g of dichloro tetrafluoroethane was forced under pressure into the Aerosol can and mixed with the vermiculite paste. Upon activation of the ejection nozzle of the can a wet froth was applied to a tray and dried in air over a period of 24 hours. The rigid foam of vermiculite produced was observed to have a very fine pore size (average diameter of bubbles = 350 μm) and a density of 0.05 g/ml.

EXAMPLE 9

South African (Mandoval "micron" grade) vermiculite (1 kg.) was refluxed for 10 hours in a mixture of water (4 l.) manganese dichloride tetrahydrate (130 g.) and concentrated hydrochloric acid (0.25 ml.). The product was washed with water and then made up to a total volume of 20 l. with water. Hydrochloric acid (75 ml. 1N solution) and hydrogen peroxide (2 l. of 30% solution) were then added and the stirred mixture warmed to 60° C. for 2 hours whereupon the vermiculite expanded to take up most of the liquid present. The mixture was then cooled, filtered, washed with water, and made up to 10 l. with added fresh water. The resulting suspension was divided into 4 equal batches and each sheared for one hour at 6500 rpm in a 5 l. vessel with a Greaves H5-Series mixer (Mark III). The combined suspension was then diluted to 16 l. with water and classified by passage through a sieve of aperture size 50 μm to give a vermiculite suspension containing 2.9% by weight of solids (all water added was distilled).

The concentration of the suspension was then increased to 20% by weight by evaporation of water by the application of heat, the mixture was cooled and a protein surfactant known commercially as "Nicerol" was then added at a concentration of 10% by volume relative to the weight of the solid vermiculite and portions of the mixture beaten in a culinary mixer to form a foam. The foam when dried in a well-ventilated oven at 90° C. had a density of 0.1 g/ml.

EXAMPLE 10

1 Kg. of South African vermiculite was refluxed aqueous solution of lithium chloride hours and after thorough washing in a Buchner funnel and standing overnight in distilled water, an eight-fold volume expansion of the original ore took place. The mixture of expanded ore and water (10% w/w of ore) was then milled for 1 hour. The larger particles of vermiculite were then removed by filtration through a 50 μm sieve and the concentration of the suspension adjusted to 20% w/w by evaporation. A protein surfactant known commercially as "Nicerol" at a concentration of 10% by volume relative to the weight of vermiculite was then added and portions of the mixture beaten in a culinary mixer to form a foam. The foam when dried in a well ventilated oven at 90° C. had a density of 0.1 g/ml.

EXAMPLE 11

A dried foam based on North American vermiculite was prepared as described in Example 4 and found to have an average size of 3.00mm and a density of 0.01 g/ml.

EXAMPLE 12

A sample of wet foam as prepared in Example 6 was blended with granules of heat expanded vermiculite such that in the resultant blend the wet foam occupied 34% of the total volume and the granules 66% of the total volume. The blend was dried in an oven at 90° C. The resultant composite structure had a density of 0.22g/ml and a compressive strength of 0.12 $MNm^{-2}$

EXAMPLE 13

A slab of foam of dimensions 62 mm × 135 mm × 4 mm cut from the foam produced in Example 5 having a density of 0.12 g/ml was placed in a furnace at 1000° C. for 10 minutes. On removal from the furnace the slab was observed not to have distorted at all visibly as a result of the intense heat, the resultant dimensions being 61 mm × 134 mm × 4 mm. The density decreased to 0.09 g/ml and the compressive strength was 0.22 $MNm^{-2}$.

These results demonstrate that the foams of this invention resist heat well and therefore can be used as a fire-protective material because they have good dimensional stability with little loss in compressive strength.

What we claim is:

1. A rigid foam comprising an inorganic cellular structure composed of lamellae of vermiculite.
2. A rigid foam comprising a cellular structure having the cell walls thereof composed of overlapping individual vermiculite lamellae adhering together by mutually attractive forces.
3. A rigid foam as claimed in claim 1 wherein the lamellae possess a smallest dimension not greater than 0.5 μm.
4. A rigid foam as claimed in claim 3 wherein the lamellae have smallest dimension not greater than 0.05 μm.
5. A rigid foam as claimed in claim 4 wherein the lamellae have length or breadth dimensions of at least one hundred times the size of the smallest dimension.
6. A rigid foam as claimed in claim 5 wherein the lamellae have length or breadth dimensions of at least one thousand times the size of the smallest dimension.
7. A rigid foam as claimed in claim 1 formed into a continuous and substantially uniform sheet foam.
8. A foam as claimed in claim 1 having a density not greater than 0.5g/ml.
9. A foam as claimed in claim 8 and having a density not greater than 0.15g/ml.
10. A process for the production of a rigid foam of vermiculite comprising the production of a suspension of vermiculite lamellae in a liquid medium, gasification of the suspension to form a froth and removal of the liquid medium from the froth by evaporation.
11. A process as claimed in claim 10 in which the liquid medium is aqueous.
12. A process as claimed in claim 11 wherein the gasification is performed by entraining gas in the suspension by rapid agitation.
13. A process as claimed in claim 12 wherein the gasification is performed by whisking or beating the whole suspension into a froth.
14. A process as claimed in claim 11 wherein the gasification is performed by intimate mixing of the suspension with a volatile liquid and evaporating the liquid in the suspension.
15. A process as claimed in claim 11 wherein the gasification is produced by rapidly heating the suspension.
16. A process as claimed in claim 10 wherein the suspension is classified by the removal of the coarser particles of vermiculite from the suspension prior to the gasification.
17. A process as claimed in claim 10 wherein a surface active agent or foaming agent is present in the suspension of vermiculite lamellae.
18. A process as claimed in claim 17 wherein the surface active agent or foaming agent is a cationic organic salt.
19. A process as claimed in claim 10 wherein a foaming agent or surface active agent is added to the suspension of vermiculite lamellae prior to gasification.
20. A process as claimed in claim 10 wherein during evaporation the foam is contacted with previously formed vermiculite structures, in the form of rigid foam or exfoliated granules, in order to cement the solid vermiculite structures together.
21. A shaped article comprising a foam as claimed in claim 1.
22. A shaped article as claimed in claim 21 having a skin of vermiculite over a substantial part of its surface.
23. A shaped article as claimed in claim 21 and consisting of a laminated sheet having vermiculite foam laminated to a sheet, film or slab of an organic polymer or plastic.
24. A shaped article as claimed in claim 23 comprising a laminate of polyurethane foam with vermiculite foam.
25. A polyurethane foam panel faced on at least one side with a coating of the foam as claimed in claim 1.
26. A shaped article as claimed in claim 21 wherein vermiculite foam is sandwiched between facing boards of material other than vermiculite.
27. A method of rendering articles fire resistant by applying to the exterior surface of the article a coating of a vermiculite foam as claimed in claim 1.

* * * * *